US008279250B2

(12) United States Patent
Okugawa

(10) Patent No.: US 8,279,250 B2
(45) Date of Patent: Oct. 2, 2012

(54) SCANNING OPTICAL DEVICE AND IMAGE FORMING APPARATUS

(75) Inventor: Yuji Okugawa, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 202 days.

(21) Appl. No.: 12/774,754

(22) Filed: May 6, 2010

(65) Prior Publication Data

US 2010/0289864 A1  Nov. 18, 2010

(30) Foreign Application Priority Data

May 14, 2009  (JP) .................................. 2009-117712

(51) Int. Cl.
*B41J 2/385* (2006.01)
*B41J 15/14* (2006.01)
*B41J 27/00* (2006.01)

(52) U.S. Cl. ........ 347/257; 347/134; 347/241; 347/242; 347/256

(58) Field of Classification Search .................... None
See application file for complete search history.

(56) References Cited

U.S. PATENT DOCUMENTS

2003/0076403 A1* 4/2003 Tajima et al. ................. 347/241
2009/0035028 A1* 2/2009 Itabashi ....................... 399/286

FOREIGN PATENT DOCUMENTS

JP  2003-114394 A  4/2003

* cited by examiner

*Primary Examiner* — Matthew Luu
*Assistant Examiner* — Kendrick Liu
(74) *Attorney, Agent, or Firm* — Cantor Colburn LLP

(57) ABSTRACT

A scanning optical device, comprises a light source to emit a light beam; a deflecting section to deflect the emitted light beam so as to scan; an optical element to make the scanning light beam to converge; and a correcting mechanism to correct an attitude of the optical element so as to adjust a convergence position of the scanning light beam; wherein at least a part of the correcting mechanism is arranged between the deflecting section and the optical element.

10 Claims, 9 Drawing Sheets

SCANNING OPTICAL DEVICE AND IMAGE FORMING APPARATUS

This application is based on Japanese Patent Application No. 2009-117712 filed on May 14, 2009, in Japanese Patent Office, the entire content of which is hereby incorporated by reference.

BACKGROUND OF THE INVENTION

The present invention relates to a scanning optical device and an image forming apparatus, which are applicable to printers (printing machines), copying machines, and compound machines of these machines, which are equipped with a scanning exposing system to scan a photoreceptor drum with a laser beam based on image information so as to form an electrostatic latent image.

In recent years, widely practically used are digital color copying machines which form a color image based on color document image data obtained by reading a document. According to color copying machines of this type, a color document image is read by a scanner and the document image data obtained from the color document image are once stored in an image memory. Thereafter, the document image data read from the image memory are subjected to image processing, and then the document image data after the image processing are transmitted to a color printer.

For example, a color printer employing an electrophotographying system is structured by an image forming section which forms a yellow (Y) color, a magenta (M) color, a cyan (C) color, and a black (BK) color image, a fixing section and an intermediate transfer belt. In the image forming section, an electrostatic latent image is formed for each image color based on document image data by a scanning exposing section with a polygon mirror on a photoreceptor drum electrically charged uniformly by a charging device.

This electrostatic latent image is developed by a developing device for each image color. Such electrically charging, exposing, and developing are performed so as to form a color toner image on the photoreceptor drum, and the color toner image is transferred onto a predetermined transfer material by a transferring section. The toner image transferred onto the transfer material is fixed by a fixing section. As a result, an image is formed based on document image data on the predetermined transfer material, whereby the document image can be copied.

At the time of forming such a color image, it is required to take synchronism among plural image forming sections to form plural different color toner images in such a way that a formation timing of each color toner image is matched to each other. Among the plural different color toner images, if a deviation takes place in the formation timing, the deviation is recognized as a color deviation which causes remarkable deterioration in image quality of a color image formed on a transfer material.

Patent document 1 discloses an image forming apparatus equipped with a mechanism which corrects a scanning exposing section of this type. According to this image forming apparatus, the scanning optical device is constituted by a laser light source, optical elements such as a cylindrical lens, a correcting section, one set of laser beam detecting sections a wire position detecting section, and the like. At the time of correcting a color deviation, the correcting section shifts optical elements, such as a cylindrical lens so as to correct the position of a scanning line on a photoreceptor drum.

The laser beam detecting section detects the upper limit and lower limit of a scanning position of a laser beam which passes through the cylindrical lens and scans on a photoreceptor drum. An optical synchronous sensor is used in the laser beam detecting section, and is structured to detect the synchronism status of a laser beam. A wire position detecting section is arranged at the reverse surface side of a mounting base plate of the cylindrical lens, and is structured to detect a shift distance of the cylindrical lens from an amount of displacement of a wire. Thus, when the scanning optical device is constituted in such a way, since a wire position detecting section can be arranged at a corner part of the apparatus which is distant from the cylindrical lens, the apparatus can be made in a compact size.

Patent document 1: Japanese Unexamined Patent Publication No. 2003-114394 (Page 6, FIG. 5 in its official document)

Incidentally, in an image forming apparatus which has a polygon mirror rotating member and deflects a laser beam so as to scan, there are the following problems.

i. In the scanning optical device which is disclosed by Patent Document 1, a correcting section to correct the attitude of a cylindrical lens is equipped with a wire position detecting section to detect the position of the cylindrical lens. This wire position detecting section is arranged at a position distant from the cylindrical lens on the reverse surface side (to a corner part of the apparatus) of a mounting base plate of the cylindrical lens.

When the wire position detecting section detects the shift distance of the cylindrical lens by an amount of displacement of a wire, it is required to remove play in a worm gear, a flat gear, a power transmission gear and the like. Namely, in order to minimize variation in driving force of the worm gear, the flat gear, the power transmission gear and the like, a mechanism which pulls these gears by a coil spring through a wire member is adopted.

However, in order to make a motor torque small, it is necessary to make the spring constant of a coil spring small. For this reason, when a coil spring having a small spring constant is employed in a mechanism to pull by a coil spring, a large installing space is needed for it. Therefore, there is a problem that the large installing space is contrary to space saving.

ii. Moreover, in the scanning optical device of Patent Document 1, it is necessary to align a mark board (follower piece) of a wire member with the center of a detecting range of the upper limit and lower limit to restrict the shift of the wire member in the sensor section for detecting a wire position.

However, since the mounting position of the wire position detecting section has no room sufficient to conduct alignment for the shifting direction of the wire member, it is difficult to align the mark board (follower piece) of the wire member with the center of the detecting range with good reproducibility.

Then, the present invention has been devised to solve the abovementioned problems, and an object of the present invention is to provide a scanning optical device and image forming apparatus in which the arrangement of a correcting section to correct the position of optical elements, such as a cylindrical lens is improved so as to be able to adjust the mounting position of the correcting section with spatial allowance, and to contribute to make the entire body of the apparatus in a small size.

The abovementioned object can be attained by the following structure which reflects one aspect of the present invention.

A scanning optical device, comprises
a light source to emit a light beam;
a deflecting section to deflect the emitted light beam so as to scan;

an optical element to make the scanning light beam converge; and a correcting mechanism to correct an attitude of the optical element so as to adjust the converged position of the scanning light beam, wherein at least a part of the correcting mechanism is arranged between the deflecting section and the optical element.

DETAILED DESCRIPTION OF THE PREFERRED EMBODIMENT OF THE PRESENT INVENTION

Hereafter, a scanning optical device and image forming apparatus according to an embodiment of the present invention will be explained with reference to drawings. However, the present invention is not limited to the embodiment.

Figure 10:
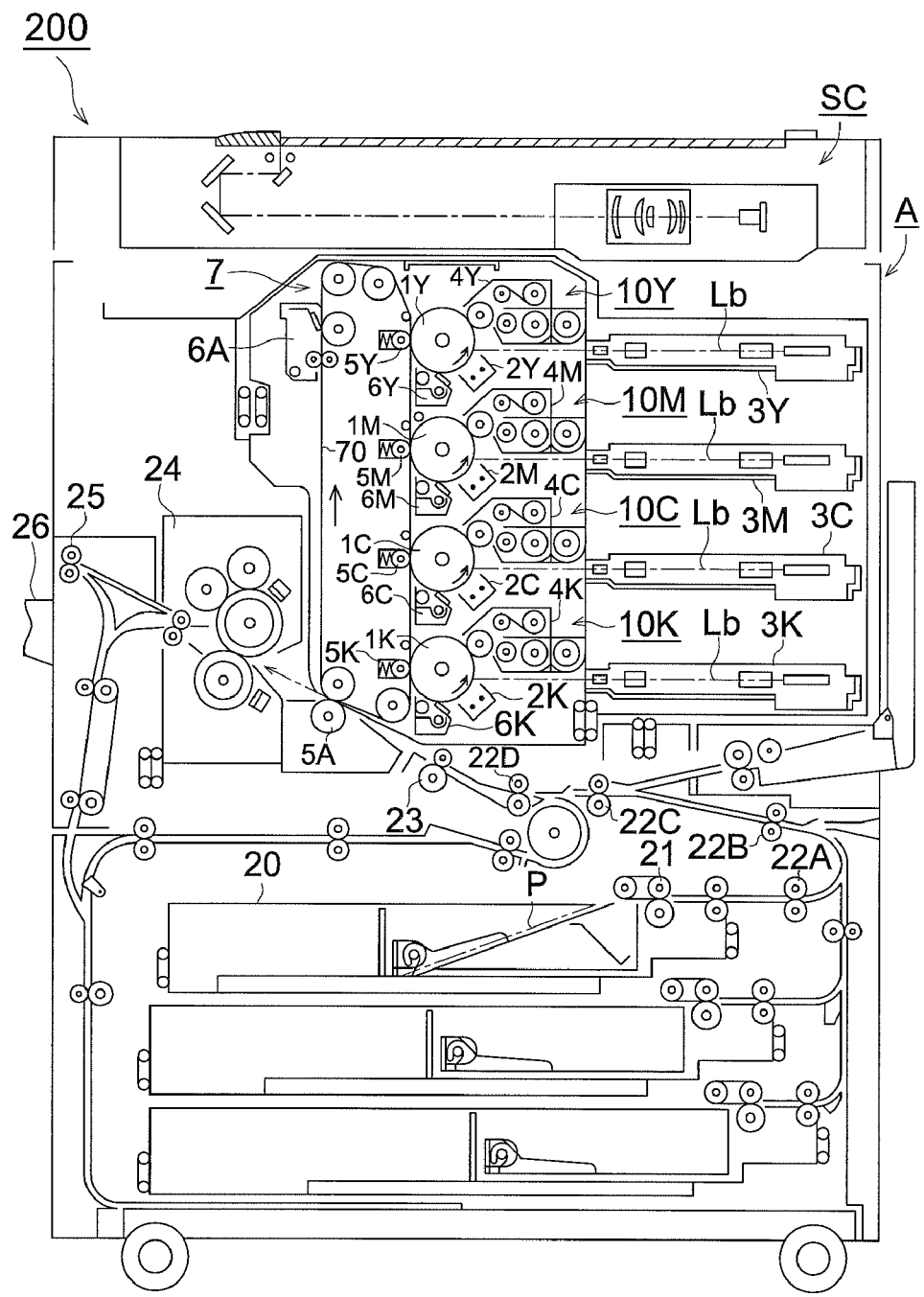
FIG. 10 is an outline view showing a structure example of a color copying machine 200 according to the present invention.

The scanning optical device of the present invention is applicable to a black and white or color image forming apparatus which scans a photoreceptor drum (image carrying member) with a light beam based on image information so as to form an electrostatic latent image. As a color image forming apparatus, for example, there is a tandem type color copying machine 200 shown in FIG. 10, and the scanning optical device of the present invention can be employed as scanning exposure units 3Y, 3M, 3C, and 3K in this color copying machine 200. As shown in FIG. 10, in the scanning exposure unit 3Y, a laser beam Lb emitted from a light source is deflected by a deflecting device, then proceeds straight, and scans a surface of a photoreceptor drum 1Y (image carrying member) in an axial direction (main scanning direction). By the rotation of the photoreceptor drum 1Y, the scanning line of a laser beam shifts in a vertical scanning direction, whereby a two-dimensional latent image can be formed on the surface of the photoreceptor-drum 1Y.

Figure 11:
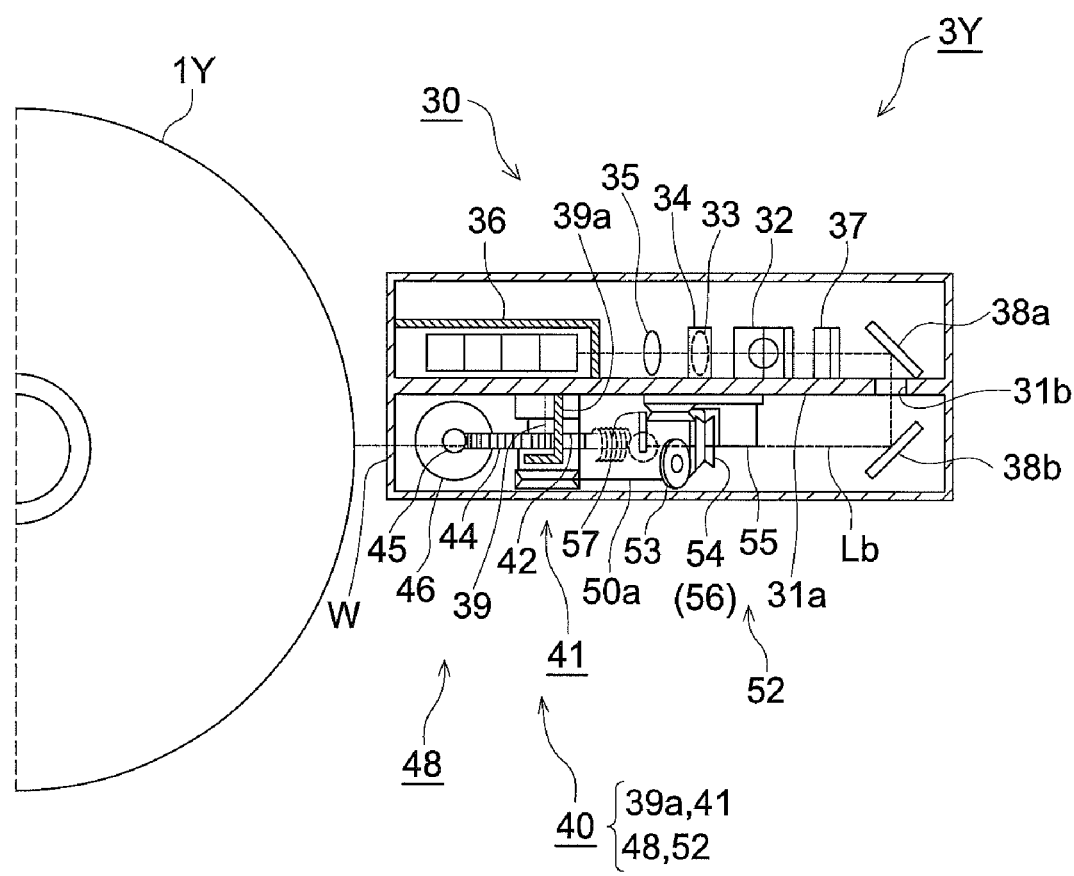
FIG. 11 is a side cross sectional view showing an operation example of a scanning exposing unit 3Y of the color copying machine 200.

Moreover, the scanning optical device of the present invention can be employed also as a scanning exposing unit 3Y shown in FIG. 11. The scanning exposing unit shown in FIG. 11 is configured in a two stage structure which consists of an upper structure provided on the obverse surface side of an intermediate partition base plate 31a and a lower structure provided on the reverse surface side of the intermediate partition base plate 31a. A scanning laser beam deflected by a deflecting device 36 in the upper structure is reflected by a first mirror section 38a provide at a scanning light beam inversing side, proceeds to the reverse surfaced side, then further is reflected by a second mirror section 38b, whereby the proceeding direction of the scanning laser beam is changed by 180 degrees from the scanning light beam inversing side to a scanning light beam exit side. The scanning laser beam having changed the proceeding direction passes through a cylindrical lens 39 being an image forming lens, is emitted from a window W at the scanning light beam exit side, and scans the surface of a photoreceptor drum 1Y. Since the scanning exposing unit having the two stage structure shown in FIG. 11 inverts an optical path of a laser beam in a U character-shaped form, the length of the scanning exposing unit can be shortened, and there is an advantage that the scanning exposing unit can be made in a small size. The scanning optical device 100 of the present invention, which is a scanning exposing unit having a two stage structure, will be explained in detail with reference to drawings.

Figure 1:
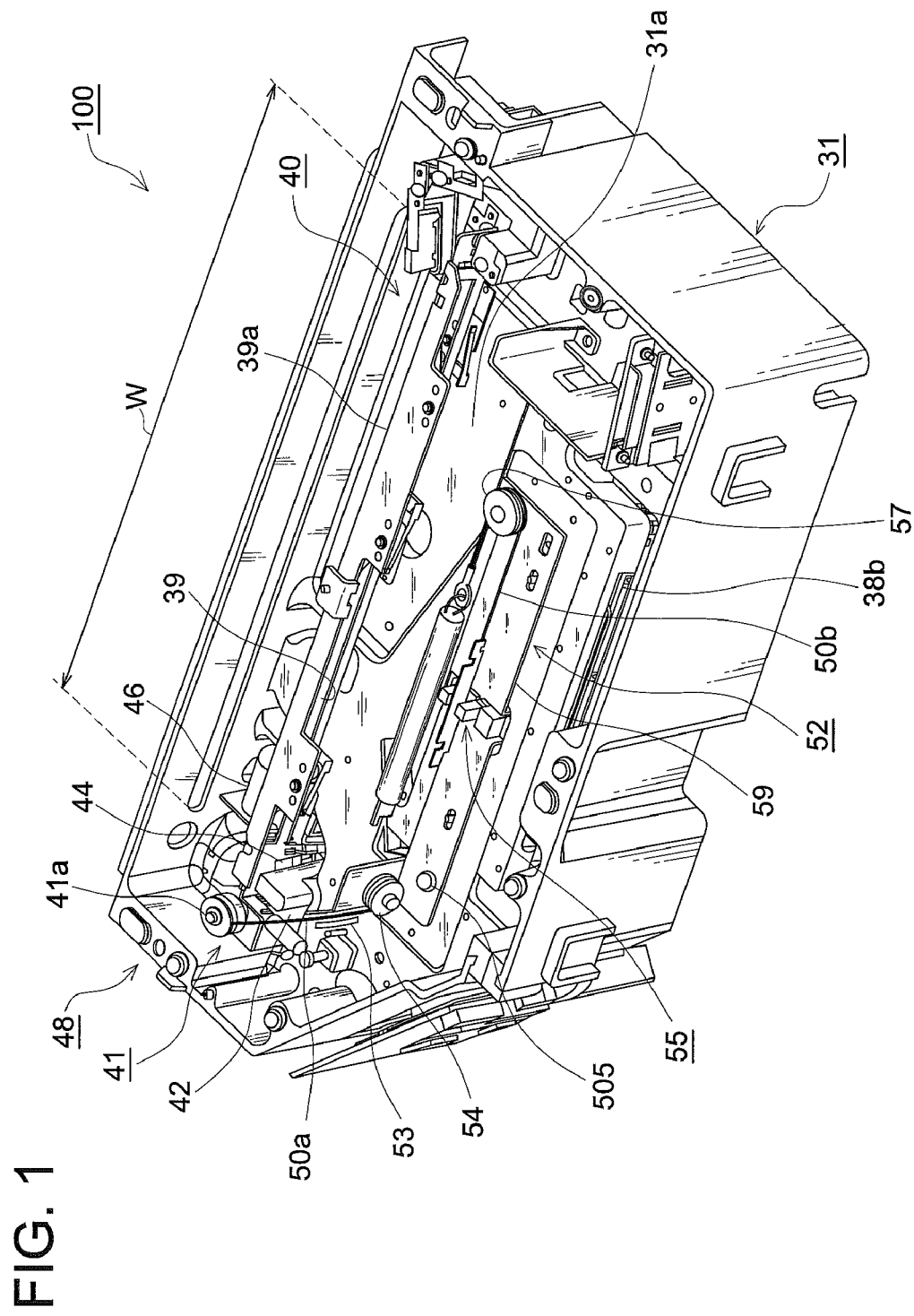
FIG. 1 is a perspective view showing a structural example of a correcting mechanism side of a scanning optical device 100 according to the present invention.

As shown in FIG. 1, the scanning optical device 100 is constituted by a pentagon-shaped case body 31 provided with an intermediate partition base plate 31a for dividing the case body 31 into two stages of an upper structure and a lower structure and lid members, which are not shown in any drawings, to cover the top face and bottom face of the case body 31. Hereafter, the side on which the upper structure such as a scanning deflecting mechanism 30 and the lie is mounted is called an obverse surface side of the intermediate partition base plate 31a.

Figure 2:
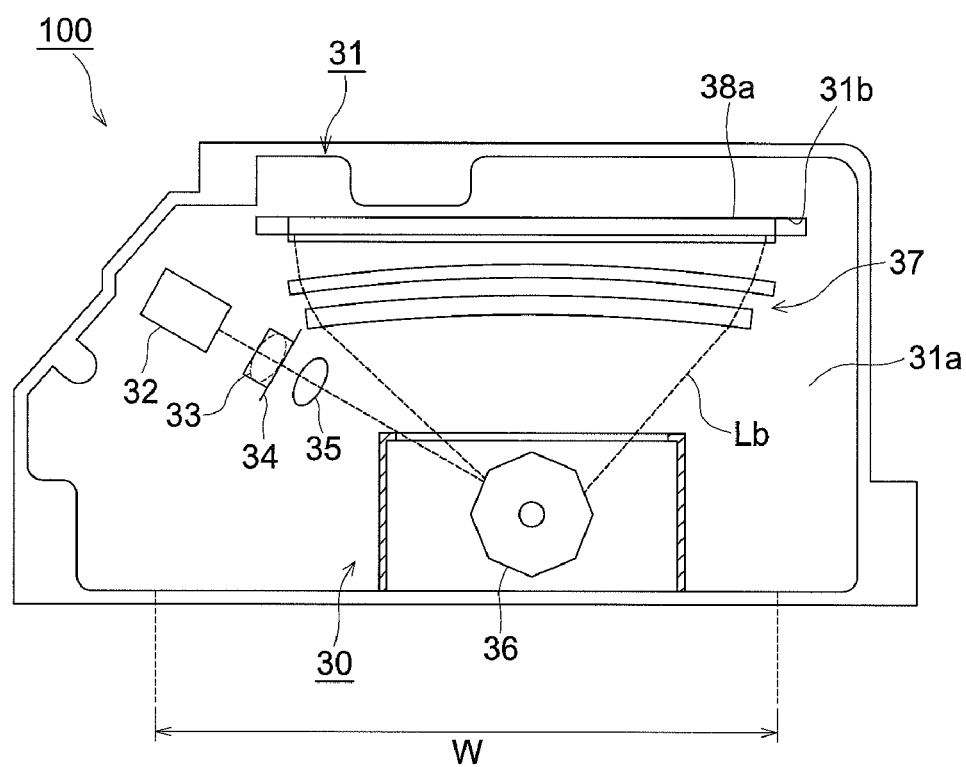
FIG. 2 is a plan view showing an assembling example of an obverse surface side of an intermediate partition base plate 31a of the scanning optical device 100.

FIG. 2 is a plan view showing an assembling example on the obverse surface side of the intermediate partition base plate 31a of the scanning optical device 100. The scanning deflecting mechanism 30 mounted on the obverse surface side of the intermediate partition base plate 31a of a case body 31 is constituted by a laser light source 32, a collimator lens 33, an aperture stop section 34, a first cylindrical lens 35, a deflecting device 36, a fθ lens 37, and a first mirror section 38a.

The laser light source 32 emits a laser beam with a predetermined intensity based on image information. As the light source, a semiconductor laser apparatus is employed. A collimator lens 33 is provided at the light outgoing side of the laser light source 32, and this collimator lens 33 shapes the laser beam emitted in the form of a diverging light flux from the laser light source 32 into the form of a parallel light flux.

An aperture stop section 34 is provided at the light outgoing side of the collimator lens 33, and this aperture stop section 34 regulates an aperture size and shapes the sectional form of the laser beam. A first cylindrical lens 35 is provided at the light outgoing side of the aperture stop section 34, and this first cylindrical lens 35 has an optical power only in a vertical scanning direction and makes a laser beam converge only in the vertical scanning direction.

A deflecting device 36 constituting a deflecting section is provided at the light outgoing side of the first cylindrical lens 35, and this deflecting device 36 deflects the laser beam emitted from the first cylindrical lens 35 so as to make the laser beam to scan. The deflecting device 36 is equipped with a polygon mirror which constitutes a polygon mirror rotating member.

The fθ lens 37 is provided at the light outgoing side of the deflecting device 36, and this fθ lens 37 makes the scanning laser beam deflected by the deflecting device 36 to scan with an equal angle. A first mirror section 38a constituting a first mirror member is provided at the light outgoing side of the lens 37, and this mirror section 38a is arranged at the scanning light beam inverting side of the intermediate partition base plate 31a, and leads the scanning laser beam deflected by the deflecting device 36 to the reverse surface side of the intermediate partition base plate 31a.

Namely, as shown in FIG. 11, a slit-shaped opening section 31b is provided at the scanning light beam inverting side of the intermediate partition base plate 31a. The first mirror section 38a is provided along one side of the opening section 31b, and reflects the scanning laser beam deflected by the scanning deflecting mechanism 30 so as to change the proceeding direction (optical path) by 90 degrees from the obverse surface side of the intermediate partition base plate 31a to the reverse surface side.

On the reverse surface side of the intermediate partition base plate 31a, a second mirror section 38b constituting a second mirror member is provided opposite to the first mirror section 38a across the opening section 31b in such a way that the second mirror section 38b reflects further the scanning laser beam reflected by the first mirror section 38a so as to lead the scanning laser beam in the direction toward the scanning light beam exit side. In this example, the scanning laser beam having been reflected by the first mirror section 38a is further reflected by the second mirror section 38b so as to change its proceeding direction by 90 degrees. As a result, the scanning laser beam deflected by the deflecting device 36 can be bent in a U character-shaped form from the obverse surface side of the intermediate partition base plate 31a to the reverse surface side.

Figure 3:
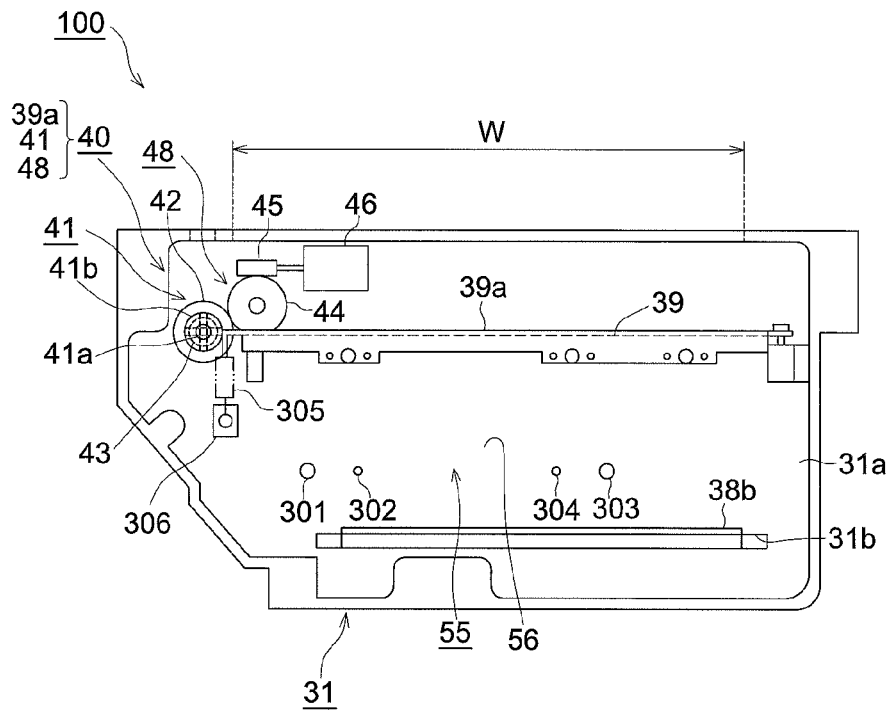
FIG. 3 is a plan view showing an assembling example of an reverse surface side of an intermediate partition base plate 31a of the scanning optical device 100.

FIG. 3 is a plan view showing an assembling example of the reverse surface side of the intermediate partition base plate 31a of the scanning optical device 100. As shown in FIG. 3, on the reverse surface side of the intermediate partition base plate 31a, in addition to the second mirror section 38b, a second cylindrical lens 39 constituting an optical element to make a scanning laser beam converge on a photoreceptor drum and a correcting mechanism 40 to correct the attitude of the second cylindrical lens 39 are provided. At the scanning light beam exit side of the case body 31, a slit-shaped window section W to allow a scanning laser beam to outgo is provided. The window section W is a section through which a scanning laser beam deflected by the scanning deflecting mechanism 30 outgoes towards a photoreceptor drum from the inside of the case body 31.

A second cylindrical lens 39 is provided at the light outgoing side of the second mirror section 38b, and this second cylindrical lens 39 is arranged at a position at which the second cylindrical lens 39 is opposite to a photoreceptor drum across the window section W. The position of the second cylindrical lens 39 is adjusted by a mechanism capable of shifting upward or downward so that the converged position of the scanning laser beam on a photoreceptor drum, or the scanning line can be adjusted.

For example, the second cylindrical lens 39 is made to be rockable around a center of oscillation in the vicinity of its center. Therefore, when one end of the second cylindrical lens 39 is shifted upward or downward, an image height of the scanning laser beam which is deflected by the deflecting device 36, passes through the lens, and is converged on a photoreceptor drum is changed.

A scanning laser beam having passed through the second cylindrical lens 39 further passes through the window section W and converges as a light spot on the photoreceptor drum. At this time, the light spot scans on the photoreceptor drum top at an equal speed in a main scanning direction as a scanning light beam by the abovementioned deflecting device 36 and the fθ lens 37.

Figure 6:
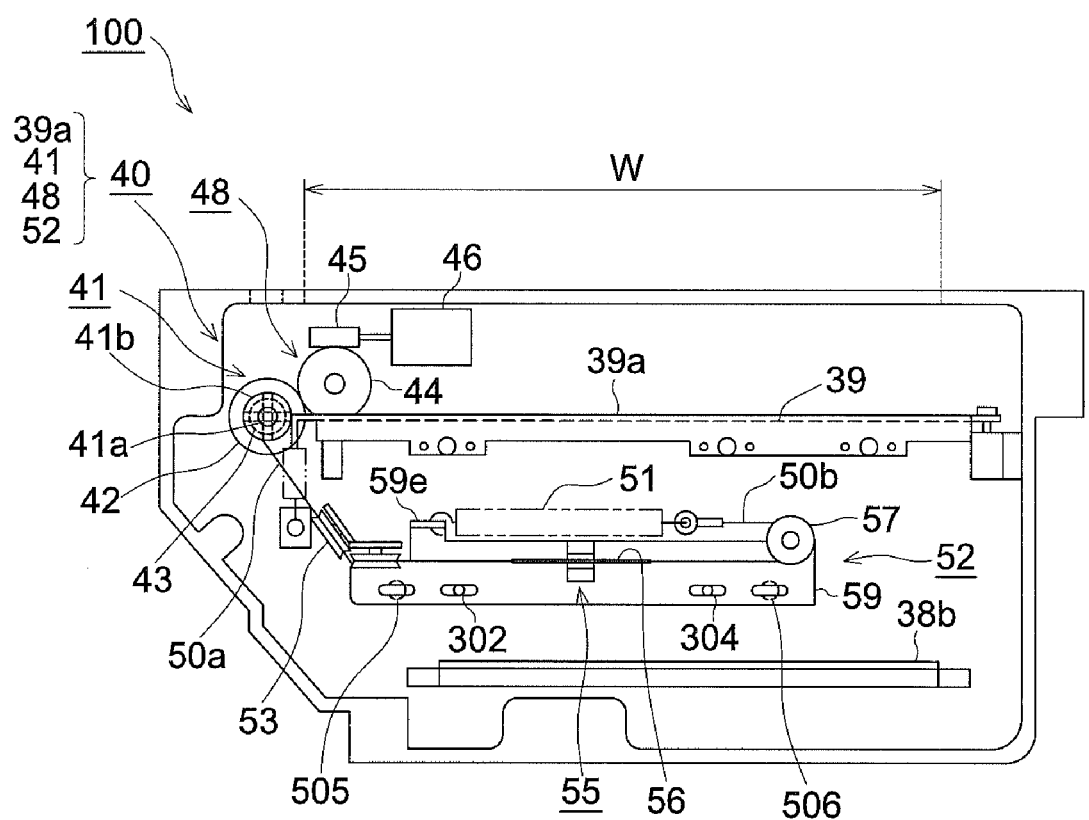
FIG. 6 is a plan view showing an assembling example of the wire position detecting mechanism 52 of the scanning optical device 100.

As shown in FIG. 6, a correcting mechanism 40 is attached to the second cylindrical lens 39. The correcting mechanism 40 corrects the attitude of the second cylindrical lens 39 so as to adjust the converged position of a scanning laser beam. In this embodiment, the correcting mechanism 40 or a part of the correcting mechanism 40 is arranged at the lower side or the upper side of an optical path in a scanning beam region in the proceeding direction of the scanning laser beam deflected by the deflecting device 36. For example, a part of the correcting mechanism 40 is arranged between the second mirror section 38b to lead the laser beam coming from the first mirror section 38a to the scanning light beam exit side and the cylindrical lens 39 to make the scanning laser beam reflected from the second mirror section 38b to converge on the photoreceptor drum. Namely, a part of the correcting mechanism 40 is arranged between a deflecting section to deflect a scanning laser beam and an optical element to make the scanning laser beam converge.

With this arrangement, a space taking place the lower side or the upper side of an optical path in the scanning beam region in the proceeding direction of the scanning laser beam between the second mirror section 38b and the second cylindrical lens 39 can be effectively utilized. Therefore, as compared with the case where the correction driving mechanism 40 is arranged outside of a scanning beam region, the scanning optical device 100 with a configuration to bend a scanning laser beam in a U character-shaped form can be made in a small size, whereby this arrangement greatly contributes to make the image forming apparatus incorporating the scanning optical device 100 in a small size.

As shown in FIG. 6, the correcting mechanism 40 is constituted by a lens shifting mechanism 48 and a wire position detecting mechanism 52. The lens shifting mechanism 48 shifts the second cylindrical lens 39 upward or downward so as to adjust the converged position of a scanning laser beam. In this example, there is provided a flame 39a for fixing the second cylindrical lens 39 such that when this flame 39a is shifted in a vertical scanning direction, the converged position of a scanning laser beam which converges on the photoreceptor drum by the second cylindrical lens 39 is adjusted.

The lens shifting mechanism 48 is constituted by a rotating up-and-down mechanism 41, a flat gear 42, a power transmission gear 44, a worm gear 45, and a motor 46. The rotating up-and-down mechanism 41 is engaged with the flame 39a for fixing a lens, and is adapted to shift the flame 39a upward or downward. For example, the rotating up-and-down mechanism 41 is constituted by a rotating shaft 41a with a screw and a nut member 43.

The nut member 43 is engaged with the screw portion of the rotating shaft 41a. The nut member 43 is provided with a groove portion to hold detachably the end portion of the flame 39a. For example, when the rotating shaft 41a rotates clockwise, the flame 39a is adapted to be shifted upward. On the contrary, when the rotating shaft 41a rotates counterclockwise, the flame 39a is adapted to be shifted downward.

The flat gear 42 is fixed to the rotating shaft 41a, and is linked or engaged with the motor 46 through the power transmission gear 44 and the worm gear 45. When the motor 46 is rotated clockwise, the rotating shaft 41a is rotated counterclockwise. On the contrary, when the motor 46 is rotated counterclockwise, the rotating shaft 41a is rotated clockwise. In the gear engaging sections among the flat gear 42, the power transmission gear 44 and the worm gear 45, there is a play due to clearance. It is structured that the play among gears is removed by the use of a wire member and an urging member.

A wire position detecting mechanism 52 constituting a wire position detecting section is provided so as to adjoin the lens shifting mechanism 48. The wire position detecting mechanism 52 detects the upper limit position and the lower limit position of the second cylindrical lens 39 shifted by the lens shifting mechanism 48, and further pulls continuously the rotating shaft 41a in a predetermined direction in order to remove play among the flat gear 42, the power transmission gear 44 and a worm gear 45.

That is, as shown in FIG. 6, the wire position detecting mechanism 52 is constituted by a first wire 50a, a second wire 50b, a coil spring 51, plural belt pulleys 53, 54, and 57, a transmission type photo sensor 55, a follower piece 56, and a base plate 59 for mounting sensors. The first wire 50a constituting a first steel wire member, and one end of the first wire 50a is connected to the rotating shaft 41a of the lens shifting mechanism 48 so as to pull the rotating shaft 41a in a predetermined direction.

The plural belt pulleys 53, 54, and 57 constituting a wire stretching direction changing member are mounted on the base plate 59 for mounting sensors. The base plate 59 is formed by a rectangular-shaped sheet metal member bent into a predetermined configuration. In this example, an obliquely standing section 59a and a standing section 59b are formed in one end portion of the base plate 59, a concave section 59c for attaching sensors is formed in the vicinity of a center, and other end portion is made in a flat surface section 59d.

A pulley 53 is attached at the tip of the obliquely standing section 59a of the base plate 59 so as to be rotatable freely and acts to change the stretching direction of the first wire 50a about 90 degrees from the vertical direction to the horizontal direction.

A transmission type optical sensor 55 constituting a photo detector is attached to a concave section 59c of the base plate 59. The optical sensor 55 has a light emitting element 55a and a light receiving element 55b. The optical sensor 55 is arranged such that a follower piece 56 is sandwiched between the light emitting element 55a and the light receiving element 55b. One end of the follower piece 56 is connected to the free end of the first wire 50a. The follower piece 56 has at its right and left sides notch sections 56a and 56b which indicate the upper limit position and lower limit position of the second cylindrical lens 39.

The other end of the follower piece 56 is connected with one end of a second wire 50b constituting a second steel wire member. A pulley 57 is attached at an end portion of a flat surface part 59a of the base plate 59 so as to be rotatable freely and acts to change the stretching direction of the second wire 50b about 180 degrees.

The other end of the second wire 50b is fixed to a free end of a coil spring 51 constituting an urging member. The above-mentioned base plate 59 has a protruding section 59e in a predetermined location. The fixed end of the coil spring 51 is hooked to the protruding section 59e so that the coil spring 51 is fixed to the base plate 59. The coil spring 51 is attached so as to pull the second wire 50b continuously.

In this embodiment, at least the wire position detecting mechanism 52 is arranged between the second mirror section 38b and the second cylindrical lens 39. As compared with the case that the wire position detecting mechanism 52 for detecting the upper limit and lower limit of the second cylindrical lens 39 is arranged outside of a scanning beam region, the above arrangement makes it possible to shape a scanning laser beam bending type scanning optical device 100 in a small size, and largely contributes to make an image forming apparatus employing the scanning optical device 100 in a small size.

Subsequently, the assembly procedure of the scanning optical device 100 will be explained with reference to FIGS. 2 to 6. First, in order to obtain an intermediate assembly of the scanning optical device 100 with the two stage configuration as shown in FIGS. 2 and 3, a pentagon-shaped case body 31 having an intermediate partition base plate 31a is prepared. The case body 31 is constituted, for example, by an aluminum die-cast member having at a predetermined location a slit-shaped window section W for allowing a scanning laser beam to go out. The window section W serves as a part through which a scanning laser beam deflected by the scanning deflecting mechanism 30 is emitted from the inside of the case body 31 to an image carrying member, such as a photoreceptor drum.

In the scanning optical device 100 with the two stage configuration, in order to invert a light path of a scanning laser beam in a "U" character-shaped form, the slit-shaped opening section 31b, which passes through from the obverse side to the reverse side of the intermediate partition base plate 31a, is formed at the scanning light beam inversing side of the intermediate partition base plate 31a of the case body 31. On the reverse surface side of the intermediate partition base plate 31a shown in FIG. 3, provided are one set of internal thread portions 301, 303 for fixing the base plate 59 for attaching sensors of the wire position detecting mechanism 52 and protrusions 302, 304 for regulating a shifting range of the base plate 59.

When such a case body 31 is prepared, as shown in FIG. 2, the scanning deflecting mechanism 30 is mounted on the obverse surface side of the intermediate partition base plate 31a. In order to incorporate the scanning deflecting mechanism 30, a laser light source 32, a collimator lens 33, an aperture stop section 34, a first cylindrical lens 35, a deflecting device 36, a fθ lens 37, and a first mirror section 38a are prepared. A semiconductor laser apparatus is used as the laser light source 32, for example.

The laser light source 32 is mounted on the obverse surface side of the intermediate partition base plate 31a with predetermined screws and the like (hereafter, in the same way). At the light outgoing side of the laser light source 32, attached is a collimator lens 33 for shaping a scanning laser beam in the form of a diverging light flux emitted from the laser light source 32 into a laser beam in the form of a parallel light flux. At the light outgoing side of the collimator lens 33, attached is the aperture stop section 34 to regulate a cross sectional shape of a laser beam.

At the light outgoing side of the aperture stop section 34, attached is the first cylindrical lens 35 having a power only in the vertical scanning direction in order to make a scanning laser beam converge only in the vertical scanning direction. At the light outgoing side of the first cylindrical lens 35, attached is the deflecting device 36 for deflecting a laser beam emitted from the laser light source 32 so as to scan. As the deflecting device 36, a polygon mirror in the form of a polygon mirror rotating member is used.

At the light outgoing side of the deflecting device 36, attached is the fθ lens 37 to make the scanning laser beam deflected by the deflecting device 36 to scan with an equal angle. At the light outgoing side of the fθ lens 37 and the scanning light beam inverting side, attached is the first mirror section 38a to lead the scanning laser beam deflected by the deflecting device 36 to the reverse surface side of the intermediate partition base plate 31a.

The first mirror section 38a is attached along one side of the opening section 31b in such a way that first mirror section 38a changes the proceeding direction (optical path) by 90 degrees from the obverse surface side of the intermediate partition base plate 31a to the reverse surface side.

By these, it becomes possible to attach the scanning deflecting mechanism 30 shown in FIG. 2 to the obverse surface side of the intermediate partition base plate 31a.

Next, as shown in FIG. 3, the second mirror section 38b, the second cylindrical lens 39 and the correcting mechanism 40 are attached onto the reverse surface side of the intermediate partition base plate 31a. The correcting mechanism 40 is assembled such that the rotating up-and-down mechanism 41 and the lens shifting mechanism 48 are attached on the flame 39a of the second cylindrical lens 39.

In this embodiment, on the reverse surface side of the intermediate partition base plate 31a, the second mirror section 38b is attached opposite to the first mirror section 38a across the opening section 31b in such a way that the second mirror section 38b reflects further the scanning laser beam reflected by the first mirror section 38a so as to lead the scanning laser beam in the direction toward the scanning light beam exit side. The second mirror section 38b is adjusted such that when an entering laser beam has changed its proceeding direction by 90 degrees by being reflected by the first mirror section 38b, the second mirror section 38b further changes the proceeding direction of the scanning laser beam by 90 degrees. With this adjustment, the scanning laser beam deflected by the deflecting device 36 changes its proceeding direction from the obverse surface side of the intermediate partition base plate 31a to the reverse surface side by 180 degrees so as to be bent in a U character-shaped form.

At the light outgoing side of the second mirror section 38b, attached are the second cylindrical lens 39 and the correcting mechanism 40. The second cylindrical lens 39 is mounted on a flame for fixing a lens, where the flame constitutes one of the correcting mechanism 40. The flame 39a is attached at a position where the flame 39a faces the window section W and can be structured to be shifted upward and downward.

For example, the flame 39a is made to be able to swing around the center of swinging in the vicinity of an optical axis so that one end of the second cylindrical lens 39 is shifted upward and downward. With this structure, the image height (inclination) of a scanning laser beam (scanning line) which is deflected by the deflecting device 36, passes the fθ lens 37 and converges on the photoreceptor drum, is changed with the swinging of the second cylindrical lens 39.

To the second cylindrical lens 39, attached is the correcting mechanism 40 to correct the attitude of the second cylindrical lens 39 so as to adjust the converged position of a scanning laser beam. The correcting mechanism 40 is constituted by a lens shifting mechanism 48 and a wire position detecting mechanism 52. In this embodiment, as shown in FIGS. 3 and 6, firstly, the lens shifting mechanism 48 is mounted on the reverse surface side of the intermediate partition base plate 31a.

In order to shift the second cylindrical lens 39 upward and downward so as to adjust the converged position of a scanning laser beam, in this example, the lens driving mechanism 48 is assembled by a rotating up-and-down mechanism 41, a flat gear 42, a power transmission gear 44, a worm gearing 45, and a motor 46. First, the rotating up-and-down mechanism 41 is engaged to the flame 39a for fixing a lens so as to enable the flame 39a to be shifted upward or downward. For example, the rotating up-and-down mechanism 41 having a rotating shaft 41a with a screw and a nut member 43 is prepared.

Then, firstly, the rotatable rotating shaft 41a is mounted on the reverse surface of the intermediate partition base plate 31a. To the tip portion of the rotating shaft 41a applied with an external thread portion, attached is a cross-shaped wire winding section 41b around which the first wire 50a can be wound.

Furthermore, on the external thread portion of the rotatable rotating shaft 41a, attached are two sheets of upper and lower disc-shaped members and a nut member 43 by screw engagement. With this attachment, between the two sheets of disc-shaped members arranged at the upper and lower positions of the nut member 43, formed are two groove portions to hold a side end portion of the flame 39a in the manner of engaging detachably. Further, the side end portion of the flame 39a to hold the second cylindrical lens 39 is made into a shape in which the side end portion is separated into two forks such that the two forks are engaged with the two groove portions.

The inside of the upper disc-shaped member among the two sheets of disc-shaped members on the nut member 43 is urged into a predetermined direction by a coil spring 305. As sown in FIG. 3, one end of the coil spring 305 is connected to the upper disc-shaped member and the other end is connected with a protruding section 30 of the intermediate partition base plate 31a.

The side end portion of the flame 39a, which is separated into two forks, is assembled so as to be pinched between the two sheets of disc-shaped members on the nut member 43 on the condition of no play. On this condition, the nut member 43 is shifted upward or downward with the rotation of the rotating shaft 41a. With this shift, the side end portion of the flame 39a holding the second cylindrical lens 39 is made also to be able to be shifted upward or downward.

The flat gear 42 is fixed to the rotating shaft 41a into one body such that the flat gear 42 is rotated together with the rotating shaft 41a. The flame 39a is assembled such that when the rotating shaft 41a is rotated clockwise, the flame 39a is shifted upward. On the contrary, when the rotating shaft 41a is rotated counterclockwise, the flame 39a is shifted downward. The flat gear 42 fixed to the rotating shaft 41a is engaged (connected) to the motor 46 through the power transmission gear 44 and the worm gear 45.

The power transmission gear 44 is mounted rotatably on the inside of the case body 31 such that the above-mentioned flat gear 42 is engaged with the power transmission gear 44. Moreover, the motor 46 capable of rotating in both of normal and reverse directions is mounted on the inside of the case body 31 and the worm gear 45 is connected to the motor shaft. The attaching position of the worm gear 45 on the motor 46 is adjusted so that the worm gear 45 is engaged with the power transmission gear 44.

With the rotation of the motor 46, the rotating shaft 41a is adapted to rotate clockwise or counterclockwise. The rotating shaft 41a is assembled such that when the motor 46 is rotated clockwise, the rotating shaft 41a rotate counterclockwise. On the contrary, the rotating shaft 41a is assembled such that when the motor 46 is rotated counterclockwise, the rotating shaft 41a rotates clockwise.

By the above assembling, the intermediate assembly of the scanning optical device 100 shown in FIG. 3 can be obtained.

In the present invention, as shown in FIG. 6, the wire position detecting mechanism 52 is provided so as to have a function to remove play due to gaps in the gear connecting sections among the flat gear 42, the power transmission gear 44 and a worm gear 45. That is, in the wire position detecting mechanism 52, a free end of the first wire 50a being wound around the wire winding section 41b located in the upper part of the rotating shaft 41a is connected with one end of the second wire 50b through the follower piece 56. Then, the other end of the second wire 50b is connected with a free end of the coil spring 51a fixed end of which is fixed to a protruding section 59e. With this structure, when the first wire 50a is pulled by the coil spring 51, the wire position detecting mechanism 52 functions so as to remove play due to gaps in the gear connecting sections.

Therefore, the first wire 50a is wound around or loosened from the wire winding section 41b in accordance with the direction of rotation of the rotating shaft 41a in such a way that the first wire 50a and the second wire 50b can be shifted rightward or leftward without play.

Figure 4:
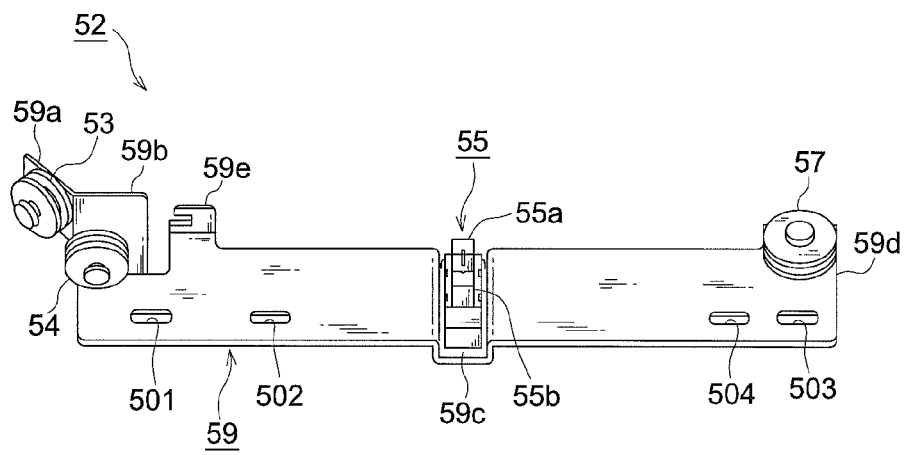
FIG. 4 is a perspective view of a base plate 59 for assembling a wire position detecting mechanism 52.

Subsequently, the assembling of the wire position detecting mechanism 52 will be explained. FIG. 4 is a perspective view of the base plate 59 for assembling the wire position detecting mechanism 52. An explanation is now made about an assembling example of the three pulleys 53, 54, and 57, the transmission type optical sensor 55 and the base plate 59 for attaching sensors except the wires 50a and 50b, the coil spring 51 and the follower piece 56 which will be explained with reference to FIG. 5.

The base plate 59 shown in FIG. 4 is fabricated such that a rectangular sheet metal member is cut out in a predetermined shape, and is bent in the configuration of the base plate 59. On the base plate 59, provided are the obliquely standing portion 59a for attaching pulleys, the standing portion 59b, a flat surface portion 59d, a concave portion 59c for attaching a sensor, and a protruding portion 59e for attaching a spring. The obliquely standing portion 59a and the standing portion 59b are provided at one end portion (left-hand side) of the base plate 59, and the concave portion 59c is provided in the vicinity of the center of the base plate 59. The flat surface portion 59d is provide at the other end portion (right-hand side) of the base plate 59, and the protruding portion 59e is provided so as to adjoin the standing section 59b.

On the base plate 59, attached are the three pulleys 53, 54, and 57 for changing the stretching direction of the first wire 50a and the second wire 50b at the time of the stretched state. The pulley 53 is attached rotatably at the tip of the obliquely standing portion 59a of the base plate 59. The pulley 54 is attached rotatably to the lower end of the standing portion 59b of the base plate 59. The pulley 57 is attached rotatably to the end portion of the flat surface portion 59d of the base plate 59. All of the pulleys 53, 54, and 57 are attached by the use of a shaft supporting pin.

The transmission type optical sensor 55 is attached to the concave portion 59c of the base plate 59. The optical sensor 55 comprises a light emitting element 55a and a light receiving element 55b. Moreover, as shown in FIG. 6, on the base plate 59, provided are four elongated hole portions 501, 502, 503, 50 in the shifting direction of the first wire 50a and the second wire 50b at positions capable of conducting positional adjustment corresponding to the internal thread portions 301, 303 and the protruding portions 302, 304 on the intermediate partition base plate 31a. The elongated hole portions 501, 503 are the opening portions for fixing with screws. The elongated hole portions 502, 504 are the opening portions to regulate the shifting range of the base plate 59. With the above assembling, the intermediate assembly of the wire position detecting mechanism 52 except the first wire 50a, the second wire 50b, the coil spring 51 and the follower piece 56 can be obtained.

Figure 5:
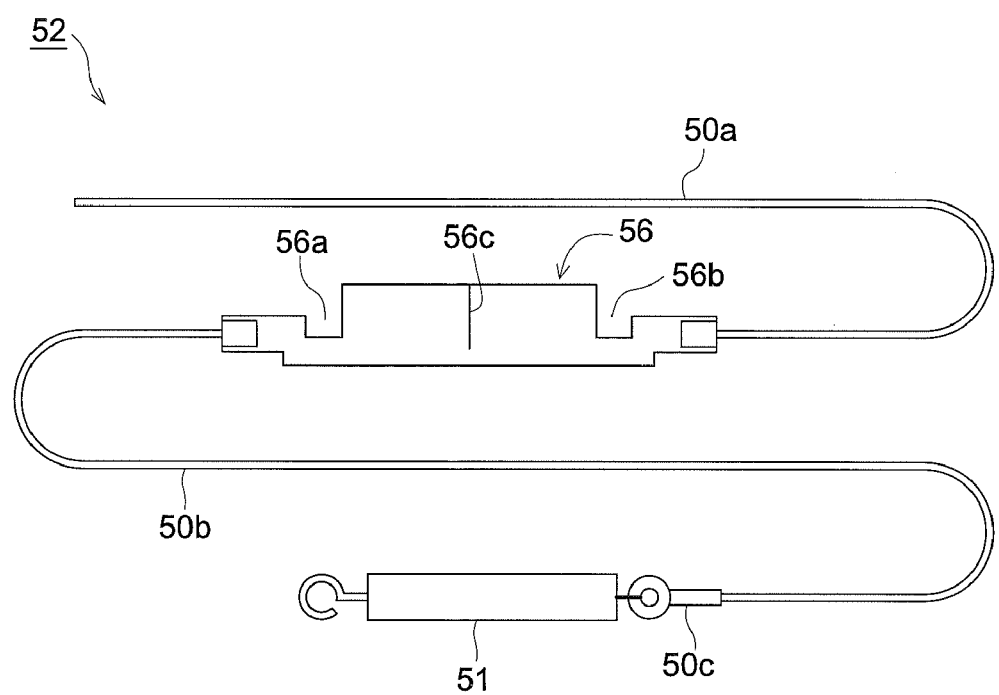
FIG. 5 is a plan view of a wire member with a follower piece.

Next, a wire member with a follower piece as shown in FIG. 5 is prepared, and a wire position detecting mechanism 52 as shown in FIG. 6 is assembled. The follower piece 56 is made by cutting out a sheet metal member into a figure shown in the drawing. As the sheet metal member, a iron plate, a nonferrous metal plate, etc. having a predetermined thickness and a light blocking property are used. A center mark 56c for positioning is provided at an almost central portion of the follower piece 56.

One end of the follower piece 56 is connected to one end of the above-mentioned first wire 50a. The one end of the follower piece 56 and the one end of the first wire 50a are joined by, for example, spot welding, caulking, brazing, and the like. Notch sections 56a, 56b to indicate the upper limit position and lower limit position of the second cylindrical lens 39 are provided at right and left positions on the follower piece 56.

The other end of the follower piece 56 is joined to one end of the second wire 50b. As the first wire 50a and the second wire 50b, a wire member made by twisting a SUS (stainless) wire is used. As with the first wire 50a, the other end of the follower piece 56 and the one end of the second wire 50b are joined by spot welding, caulking, brazing, and the like. The other end of the second wire 50b is attached and fixed to a free end of a coil spring 51. As the coil spring 51, a spring having a small spring constant can be used. By these, the wire member with the follower piece capable of being incorporated in the wire position detecting mechanism 52 can be prepared.

When the case body 31 in which the scanning deflecting mechanism 30 is attached, the wire position detecting mechanism 52, the wire member with the follower piece have been prepared, as shown in FIG. 6, the wire position detecting mechanism 52 and the wire member with a follower piece are incorporated in the case body 31 so that the correction driving mechanism 40 is mounted.

In this example, on the position adjoining the lens shifting mechanism 48 shown in FIG. 6, attached is the wire position detecting mechanism 52 to detect the upper limit position and the lower limit position of the second cylindrical lens 39 and to pull continuously the rotating shaft 41a in a predetermined direction. The wire position detecting mechanism 52 is arranged between the second mirror section 38b and the second cylindrical lens 39. With this arrangement, it becomes possible to utilize a space taking place at a lower side or a upper side of an optical path in the scanning beam region in the proceeding direction of a scanning beam between the second mirror section 38b and the second cylindrical lens 39.

In the lens shifting mechanism 48 explained in FIG. 3, the wire position detecting mechanism 52 is attached to remove play due to gaps in gear connecting sections among the flat gear 42, the power transmission gear 44 and the worm gear 45. For this purpose, when the wire position detecting mechanism 52 is mounted on the reverse surface of the intermediate partition base plate 31a of the case body 31, the base plate 59 is fixed to the reverse surface through a plurality of elongated hole sections 501, 502, 503, 504.

At this time, the elongated hole section 502 of the base plate 59 is engaged with the protruding section 302 of the intermediate partition base plate 31a, and similarly, the elongated hole section 504 is engaged with that protruding section 304. Further, through two elongated hole sections 501, 503, the base plate 59 is threadably fixed to the intermediate partition base plate 31a. In this way, the wire position detecting mechanism 52 can be attached adjustably to the lens shifting mechanism 48 previously mounted on the intermediate partition base plate 31a.

Moreover, the positioning center mark 56c provided in the almost central portion of the follower piece 56 connected to the lens shifting mechanism 48 by the first wire 50a and the second wire 50b can be aligned with the optical axis of the optical sensor 55 attached to the base plate 59.

At this time, the follower piece 56 is arranged with the attitude on which the follower piece 56 is put between the light emitting element 55a and the light receiving element 55b of the optical sensor 55. If the follower piece 56 is constituted in this way, the positioning of the wire position detecting mechanism 52 on the base plate 59 is adjusted easily in a short time to the lens shifting mechanism 48 previously mounted on the intermediate partition base plate 31a. With this, the adjustment area of the second cylindrical lens 39 can be securely held so as to locate its shifting center at position of the center mark 56c on the central portion of the follower piece 56.

One end of the first wire 50a is connected to the rotating shaft 41a of the lens driving mechanism 48 so as to pull the rotating shaft 41a in a predetermined direction, and the first wire 50a is hooked on the pulley 53, then the first wire 50a is attached so as to change the stretching direction by an angle of about 90 degrees from a horizontal direction to a vertical direction.

Subsequently, the first wire 50a is hooked on the pulley 54, and the first wire 50a is attached so as to change the stretching direction by an angle of about 90 degrees from a vertical direction to a horizontal direction. Furthermore, the second wire 50b is hooked on the pulley 57, and the second wire 50b is attached to change the stretching direction by an angle of about 180 degrees. A fixed end of the coil spring 51 is hooked and fixed on the protruding section 59e of the above-mentioned base plate 59 and a free end of the coil spring 51 and one end of the second wire 50b are connected and structured such that tension is applied always to the first wire 50a and the second wire 50b. With this, the scanning optical device 100 in which the correcting mechanism 40 of the cylindrical lens 39 is incorporated as shown in FIG. 6 has been completed.

If the scanning optical device 100 is constituted in this way, the wire position detecting mechanism 52 constituting a part of the correcting mechanism 40 can be arranged between the second mirror section 38b and the second cylindrical lens 39. Therefore, as compared with the case that the wire position detecting mechanism 52 for detecting the upper limit and the low limit of the second cylindrical lens 39 is arranged at the outside of a scanning beam region, the arrangement of the present invention makes it possible to downsize the scanning laser beam bending type scanning optical device 100. As a result, the arrangement of the present invention can contribute to the downsizing of the image forming apparatus incorporating the scanning optical device 100.

Figure 7A:
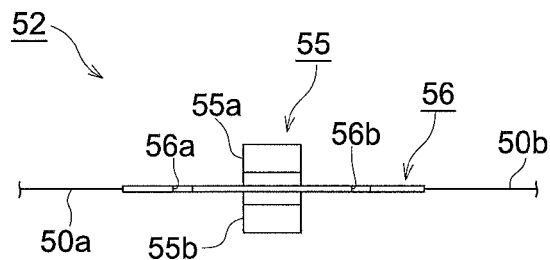
FIG. 7A to 7C is a top view, front view, and side view showing an operation example of the wire position detecting mechanism 52.

Next, with reference to FIGS. 7 to 9, the action of the wire position detecting mechanism 52 will be explained. FIG. 7A shows a transmission type optical sensor 55 of the wire position detecting mechanism 52. The optical sensor 55 detects the follower piece 56 shifting along the optical sensor 55, that is, detects the shift of the first wire 50a and the second wire 50b. By detecting the shift position of the first wire 50a and the second wire 50b, it become possible to detect the shift allowable range of the second cylindrical lens shown in FIG. 1, that is, an allowable range of the upper limit and the lower limit of a converged position of a scanning laser beam which has passed through the second cylindrical lens and converges on the photoreceptor drum.

The optical sensor 55 is constituted by the light emitting element 55a and the light receiving element 55b. The optical sensor 55 is arranged such that the light emitting element 55a and the light receiving element 55b are located opposite to each other across the follower piece 56 having a light blocking capability. The follower piece 56 is connected at its both sides to the first wire 50a and the second wire 50b and is applied with tension continuously.

Figure 7B:
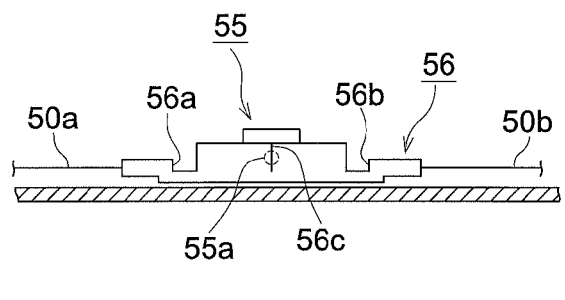
Figure 7C:
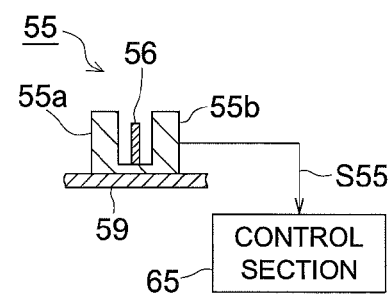

As shown in FIG. 7B, on the condition the position of the center mark 56c of the follower piece 56 becomes coincident with that of the optical axis of the optical sensor 55, since the follower piece 56 exists between the light emitting element 55a and the light receiving element 55b, light emitted from the light emitting element 55a is blocked by the follower piece 56 and does not reach the light receiving element 55b, whereby the optical sensor 55 becomes an OFF state. The optical sensor 55 outputs a wire detection signal S55 showing the OFF state, for example, a low level signal to a control section 65 shown in FIG. 7C.

The optical sensor 55 outputs the wire detection signal S55 of the low level showing the OFF state to the control section 65 until one of the notch sections 56a and 56b at the right and left sides of the follower piece 56 arrives right before the optical axis of the optical sensor 55.

Figure 8A:
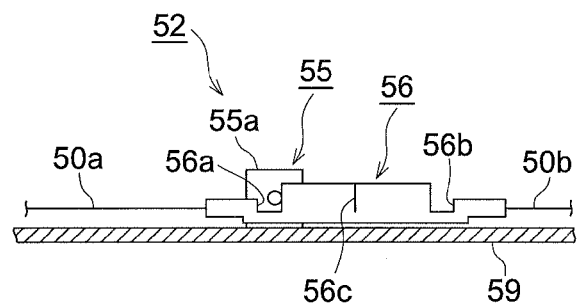
FIG. 8A to 8B is a top view, front view, and side view showing an operation example of the wire position detecting mechanism 52.
Figure 8B:
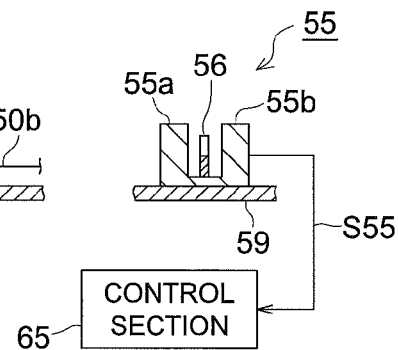

FIG. 8A shows the condition that after the follower piece 56 is pulled to the right side by the first wire 50a and the second wire 50b, the center mark 56c is moved to the right side of the optical axis of the optical sensor 55. On this condition, since the optical axis of the optical sensor 55 passes through the notch section 56a, light emitted from the light emitting element 55a passes through the notch section 56a without being blocked by the follower piece 56 and reaches the light receiving element 55b. Therefore, the optical sensor 55 becomes an ON state, and outputs the wire detection signal S55 showing the ON state, for example, a high level signal to the control section 65 shown in FIG. 8B.

Next, after the follower piece 56 is pulled to the left side by the first wire 50a and the second wire 50b from the condition shown in FIG. 8A, when the notch section 56a of the follower piece 56 is moved to the left side, the optical sensor 55 shifts from the ON state to the OFF state. On this OFF state, the optical sensor 55 outputs the wire detection signal S55 of a low level to the control section 65 shown in FIG. 8B.

Figure 9A:
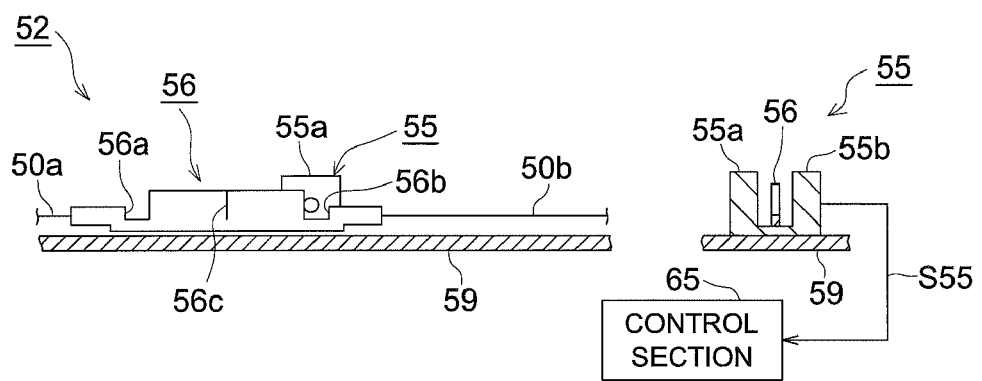
FIG. 9A to 9B is a top view, front view, and side view showing an operation example of the wire position detecting mechanism 52.

FIG. 9A shows the condition that after the follower piece 56 is pulled to the left side by the first wire 50a and the second wire 50b, the center mark 56c is moved to the left side of the optical axis of the optical sensor 55. On this condition, since the optical axis of the optical sensor 55 passes through the notch section 56b, light emitted from the light emitting element 55a passes through the notch section 56b without being blocked by the follower piece 56 and reaches the light receiving element 55b. Therefore, the optical sensor 55 becomes from the OFF state to an ON state, and outputs the wire detection signal S55 of a high level showing the ON state to the control section 65 shown in FIG. 9B.

Figure 9B:
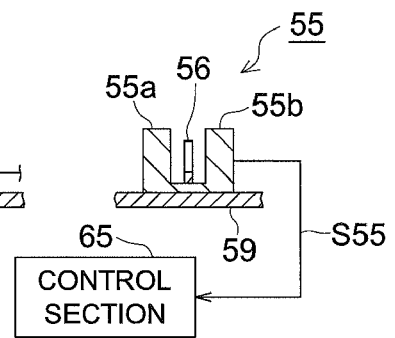

Further, from the condition shown in FIG. 9A, the first wire 50a and the second wire 50b are pulled to the right side and the notch section 56b of the follower piece 56 is moved to the right side, the optical sensor 55 shifts from the ON state to an OFF state, and outputs the wire detection signal S55 of a low level showing the OH state to the control section 65 shown in FIG. 9B.

By such action, in the wire position detecting mechanism 52, the optical sensor 55 detects that the first wire 50a and the second wire 50b reach a limited point in a shift allowable range. Further, since the wire position detecting mechanism 52 is arranged between the second mirror section 38b and the second cylindrical lens 39, the fixing position of the base plate 59 for attaching sensors can be adjusted with allowances to the lens shifting mechanism 48 previously mounted on the intermediate partition base plate 31a.

The control section 65 controls based on the wire detection signal S55 (detection information) to stop the driving of the motor 46. With this, the scanning optical device 100 can scan on a photoreceptor drum with a scanning laser beam without deviating the converged position of the scanning laser beam on the photoreceptor drum from an adjustment allowable range to allow the upper limit position and lower limit position.

Subsequently, with reference to FIG. 10, a color copying machine 200 which can be applied with the scanning optical device of the present invention will be explained. A tandem type color copying machine 200 shown in FIG. 10 constitutes an example of an image forming apparatus, and the scanning optical device 100 according to the present invention can be equipped as the scanning exposing units 3Y, 3M, 3C, and 3K for every color. The color copying machine 200 is constituted by a secondary transfer section 5A, a cleaning section 6A, an intermediate transfer unit 7, an image forming sections 10Y, 10M, 10C, and 10K for forming images of a yellow (Y) color, a magenta (M) color, a cyan (C) color and a black (BK) color, a paper sheet cassette 20, a sheet feeding section 21, plural intermediate rollers 22A, 22B, 22C, and 22D, a registration roller 23, a fixing section 24, and an intermediate transfer belt 70 (image carrying member).

The image forming section 10Y for forming a Y color image is constituted by a photoreceptor drum 1Y (image carrying member), an electrically charging section 2Y, a scanning exposing unit 3Y, a developing section 4Y, a primarily transferring section 5Y, and a cleaning section 6Y. In the image forming section 10Y, electrically charging, exposing, and developing are performed so as to form a Y color toner image on the photoreceptor drum 1Y.

The scanning exposing unit 3Y constitutes an example of a scanning exposing section, scans the photoreceptor drum 1Y with a scanning laser beam light Lb based on image information so as to form an electrostatic latent image. The scanning optical device 100 according to the present invention is used for the scanning exposing unit 3Y. As shown in FIG. 2, the scanning exposing unit 3Y comprises the laser light source 32, the deflecting device 36 to make a laser beam light Lb emitted from the laser light source 32 to scan, the first mirror section 38a and the second mirror section 38b to lead the scanning laser beam light Lb deflected by the deflecting device 36 in a predetermined direction, the second cylindrical lens 39, and the correcting mechanism 40 to correct the attitude of the second cylindrical lens 39 at the time of a color deviation correction so as to adjust the converged position of the scanning laser beam light Lb on the photoreceptor drum 1Y.

The correcting mechanism 40 or a part of the correcting mechanism 40 is arranged at the scanning beam region between the deflecting device 36 and the first mirror section 38a or the scanning beam region between the second mirror section 38b and the second cylindrical lens 39. Alternatively, it may be arranged in both of the above two scanning beam regions. In this embodiment, as showed in FIG. 6, a part of the correcting mechanism 40 is arranged under or above the optical path in the scanning beam region of the proceeding direction of a scanning laser beam light Lb deflected by the deflecting device 36.

As with the scanning exposing unit 3Y, in the scanning exposing unit 3M, the deflecting device 36 deflects a laser beam emitted from the laser light source 32. The first mirror section 38a and the second mirror section 38b and the second cylindrical lens 39 and the like lead a scanning laser beam deflected by the deflecting device 36 in a predetermined direction. The correcting mechanism 40 corrects the attitude of the second cylindrical lens 39 at the time of a color deviation correction.

The image forming section 10M for forming a M color image is constituted by a photoreceptor drum 1M, an electrically charging section 2M, a scanning exposing unit 3M, a developing section 4M, a primarily transferring section 5M, and a cleaning section 6M. As the scanning exposing unit 3M, the scanning optical device 100 according to the present invention is used. In the image forming section 10M, electrically charging, exposing, and developing are performed so as to form a M color toner image on the photoreceptor drum 1M.

The image forming section 10C for forming a C color image is constituted by a photoreceptor drum 1C, an electrically charging section 2C, a scanning exposing unit 3C, a developing section 4C, a primarily transferring section 5C, and a cleaning section 6C. As the scanning exposing unit 3C, the scanning optical device 100 according to the present invention is used. In the image forming section 10C, electrically charging, exposing, and developing are performed so as to form a C color toner image on the photoreceptor drum 1C.

The image forming section 10Bk for forming a Bk color image is constituted by a photoreceptor drum 1Bk, an electrically charging section 2Bk, a scanning exposing unit 3Bk, a developing section 4Bk, a primarily transferring section 5Bk, and a cleaning section 6Bk. As the scanning exposing unit 3Bk, the scanning optical device 100 according to the present invention is used. In the image forming section 10Bk, electrically charging, exposing, and developing are performed so as to form a Bk color toner image on the photoreceptor drum 1Bk.

The intermediate transfer unit 7 is provided to adjoin the above-mentioned image forming sections 10Y to 10K, and the intermediate transfer unit 7 has an intermediate transfer belt 70 in an endless shape with semi-conductivity. The intermediate transfer belt 70 is wound around plural rollers and supported rotatably.

The Y, M, C, and Bk color toner images formed by the image forming sections 10Y, 10M, 10C, and 10K are transferred sequentially by the primarily transferring sections 5Y, 5M, 5C, and 5K onto the intermediate transfer belt 70 in synchronization with the rotation of the intermediate transfer belt 70. With this transferring, the Y, M, C, and Bk color toner images are superimposed so as to form a synthesized color image on the intermediate transfer belt 70.

On the other hand, the sheet feeding section 21 feed out a paper sheet P accommodated in the sheet paper cassette 20, and the paper sheet P is conveyed to the secondary transfer section 5A through plural intermediate rollers 22A, 22B, 22C, and 22D and a registration roller 23. The color images superimposed on the intermediate transfer belt 70 are collectively transferred by the secondary transfer section 5A onto the paper sheet P. The paper sheet P on which the color image are transferred is subjected to a fixing treatment by the fixing section 24, and is pinched and conveyed by the paper ejecting rollers 25 onto the delivery tray 26 located outside of the machine.

Subsequently, with reference to FIG. 11, an operational example of the scanning exposing unit 3Y in the color copying machine 200 will be explained. In this example, an explanation is made about the scanning exposing unit 3Y for forming a Y color image. However, in the scanning exposing units 3M to 3K for forming other color images, the correcting mechanism 40 or a part of the correcting mechanism 40 is also arranged between the second mirror section 38b to lead a scanning laser beam led from the first mirror section 38a in a predetermined direction and the second cylindrical lens 39 to make the scanning laser beam led from the second mirror section 38b to converge on a photoreceptor drum.

In the image forming section 10Y for forming a Y color image, the photoreceptor drum 1Y is electrically charged in a predetermined electric potential by the electrically charging section 2Y. The scanning exposing unit 3Y scans the photoreceptor drum 1Y with a scanning laser beam Lb based on image information so as to form an electrostatic latent image.

The laser light source 32 shown in FIG. 11 emits a laser beam with a predetermined intensity based on image information, and the collimator lens 33 shapes the laser beam Lb emitted in the form of a diverging light flux from the laser light source 32 into the laser beam Lb in the form of a parallel light flux. Then, the aperture stop section 34 regulates an aperture size and shapes the sectional form of the laser beam Lb, and the first cylindrical lens 35 makes the laser beam Lb converge only in the vertical scanning direction.

The deflecting device 36 deflects the laser beam Lb emitted from the first cylindrical lens 35 so as to make the laser beam to scan, and the fθ lens 37 makes the scanning laser beam to scan with an equal angle. The first mirror section 38a leads the scanning laser beam deflected by the deflecting device 36 from the obverse surface side to the reverse surface side of the intermediate partition base plate 31a. Namely, the first mirror section 38a is provided along one side of the opening section 31b, and reflects the scanning laser beam deflected by the scanning deflecting mechanism 30 so as to change the proceeding direction by 90 degrees from the obverse surface side of the intermediate partition base plate 31a to the reverse surface side.

The second mirror section 38b reflects further the scanning laser beam Lb reflected by the first mirror section 38a so as to change the proceeding direction by an angle of about 90 degrees. With this, the scanning laser beam Lb deflected by the deflecting device 36 can be bent in a U character-shaped form from the obverse surface side of the intermediate partition base plate 31a to the reverse surface side. The second cylindrical lens 39 makes the scanning laser beam Lb led from the second mirror section 38b to converge on a photoreceptor drum. The second cylindrical lens 39 is structured to adjust the converged position of the scanning laser beam on the photoreceptor drum.

For example, the second cylindrical lens 39 changes the image height of a scanning laser beam Lb which has been deflected by the deflecting device 36 and has passed through the fθ lens 37. When the scanning laser beam Lb having passed through the second cylindrical lens 39 passes through the window section W and converges as a light spot on the photoreceptor drum 1Y, the light spot of the scanning laser beam L scans in the main scanning direction at an equal speed on the photoreceptor drum 1Y by the deflecting device 36 and the fθ lens 37. At the time of correcting color deviation, the correcting mechanism 40 corrects the attitude of the second cylindrical lens 39 so as to adjust the converged position of the optical spot of the scanning laser beam Lb. Since the operation example of the correcting mechanism 40 has been explained in FIG. 7, the explanation about it is omitted in here.

The developing section 4Y develops the electrostatic latent image formed on the photoreceptor drum 1Y with a Y color toner. The primarily transferring section 5Y transfers the Y color toner image formed on the photoreceptor drum 1Y to the intermediate transfer belt 70. The remaining Y color toner on the photoreceptor drum 1Y after the transferring is cleaned by the cleaning section 6Y. Since the scanning exposing units 3M to 3K operates in the same manner, the explanation about it is omitted in here.

The Y, M, C, and Bk color toner images formed by the image forming sections 10Y, 10M, 10C, and 10K are transferred sequentially by the primarily transferring sections 5Y, 5M, 5C, and 5K onto the intermediate transfer belt 70 in synchronization with the rotation of the intermediate transfer belt 70. With this transferring, the Y, M, C, and Bk color toner images are superimposed so as to form a synthesized color image on the intermediate transfer belt 70.

On the other hand, the sheet feeding section 21 feed out a paper sheet P accommodated in the sheet paper cassette 20, and the paper sheet P is conveyed to the secondary transfer section 5A through plural intermediate rollers 22A, 22B, 22C, and 22D and a registration roller 23. The color images superimposed on the intermediate transfer belt 70 are collectively transferred by the secondary transfer section 5A onto the paper sheet P. The paper sheet P on which the color image are transferred is subjected to a fixing treatment by the fixing section 24, and is pinched and conveyed by the paper ejecting rollers 25 onto the delivery tray 26 located outside of the machine.

After the color image has been transferred onto the paper sheet P by the secondary transfer section 5A, residual toner remaining on the intermediate transfer belt 70 which has separated the paper sheet P by its curvature, is removed by the cleaning section 6A. During image forming processing, the primarily transferring section 5K is brought continuously in pressure contact with the photoreceptor drum 1K. Other primarily transferring sections 5Y, 5M and 5C are brought in pressure contact with the respective photoreceptor drums 1Y, 1M, and 1C only at the time of forming a color image. The secondary transfer section 5A is brought in pressure contact with the intermediate transfer belt 70 only when a paper sheet P passes through here so as to conduct the secondary transfer.

In this manner, the scanning optical device 100 according to the present invention is equipped as the scanning exposing units 3Y and 3M of the color copying machine 200, 3C, and 3K. The correcting mechanism 40A or a part of the correcting mechanism 40 which corrects the attitude of the second cylindrical lens 39 to make a scanning laser beam Lb to converge on a photoreceptor drum so as to adjust the converged position of the scanning laser beam Lb on the photoreceptor drum, is arranged under the optical path or above the optical path in the scanning beam region in the proceeding direction of the scanning laser beam Lb deflected by the deflecting device 36.

With this arrangement, it becomes possible to utilize effectively a pace taking place under the optical path or above the optical path in the scanning beam region in the proceeding direction of the scanning laser beam between the second mirror section 38b and the second cylindrical lens 39. Therefore, as compared with a color copying machine in which the wire position detecting mechanism 52 is arranged at the outside of a scanning beam region, the arrangement of the present invention largely contributes to downsize the color copying machine 200 incorporating the scanning exposing units 3Y, 3M, 3C, 3K having an embodiment to bent a scanning laser beam Lb.

The present invention can be applied extremely suitably to a printer (printing machine), a copying machine, a compound machine, and so on, which are equipped with a scanning exposing system which scans a photoreceptor drum with a scanning laser beam based on image information so as to forms an electrostatic latent image.

The abovementioned embodiments of the present invention can be summarized as follows.

A scanning optical device related to Item (1) comprises a light source; a scanning section to make a light beam emitted from the light source to scan; an optical element to lead the scanning light beam by the scanning section in a predetermined direction; and a correcting mechanism to correct the attitude of the optical element so as to adjust the position of the scanning light beam; the correcting mechanism or a part of the correcting mechanism is arranged below the scanning light beam region or above the scanning light beam region in the proceeding direction of the light beam scanning by the scanning section.

According to the scanning optical device related to Item (1), the scanning section makes a light beam emitted from the light source to scan. The optical element leads the scanning light beam by the scanning section in the predetermined direction. The correcting mechanism corrects the attitude of the optical element. On the assumption of the above structure, the correcting mechanism or a part of the correcting mechanism is arranged below the scanning light beam region or above the scanning light beam region in the proceeding direction of the light beam scanning by the scanning section. With this arrangement, it becomes possible to utilize effectively a space taking place below the scanning light beam region or above the scanning light beam region in the proceeding direction of the light beam.

In the scanning optical device related to Item (2), the scanning optical device described in Item (1) is equipped with at least a base plate on which the light source and the scanning section are mounted; a first mirror member which is mounted on one surface of the base plate and leads the scanning light beam by the scanning section into a predetermined direction; a second mirror member which is mounted on another surface of the base plate and leads the scanning light beam led from the first mirror member into a predetermined direction; and a lens member which leads the scanning light beam led from the second mirror member into a predetermined direction; wherein the correcting mechanism or a part of the correcting mechanism is arranged in the scanning light beam region between the scanning section and the first mirror member or in the scanning light beam region between the second mirror member and the lens member.

In the scanning optical device related to Item (3), in Item (2), the correcting mechanism comprises a shifting section to shift the lens member so as to adjust the position of the light beam and a detecting section to detect the upper limit position and the lower limit position of the lens member shifted by the shifting section, wherein at least the detecting section is arranged between the second mirror member and the lens member.

In the scanning optical device related to Item (4), in Item (3), the detecting section comprises a first steel wire member whose one end is connected to the shifting section; a follower piece which has a notch section to specify the upper limit position and the lower limit position of the lens member and whose one end is connected to the other end of the first steel wire member; a second steel wire member whose one end is connected to the other end of the follower piece; an urging member whose one end is connected to the other end of the second steel wire member; a base plate used for attaching sensors and having a protruding section to which the other end of the urging member is fixed; an optical sensor which is attached to the base plate for attaching sensors and is arranged so as to nip the follower piece and a direction changing member to change the stretching direction of the first and second steel wire members.

In the scanning optical device related to Item (5), in Item (4), a plurality of elongated hole sections are provided in the shifting direction of the steel wire member at an adjustable position on the base plate for attaching sensors, and the base plate for attaching sensors is fixed with screws through the plurality of elongated hole sections to the base plate of the apparatus on which the shifting section is mounted.

In the scanning optical device related to Item (6), in Item (5), a correction center mark is provide at a central portion of the follower piece connected to the shifting section by the steel wire member and the position of the correction center mark of the follower piece is aligned with the optical axis of the optical sensor attached to the base plate for attaching sensors.

An image forming apparatus related to Item (7) comprises a photoreceptor drum; and a scanning exposing section for scanning the photoreceptor drum with a scanning light beam based on image information so as to form an electrostatic latent image; the scanning exposing section comprises a light source; a scanning section to make a light beam emitted from the light source to scan; an optical element to lead the scanning light beam by the scanning section in a predetermined direction; and a correcting mechanism to correct the attitude of the optical element so as to adjust the position of the scanning light beam; the correcting mechanism or a part of the correcting mechanism is arranged below the scanning light beam region or above the scanning light beam region in the proceeding direction of the light beam scanning by the scanning section.

According to the scanning optical device related to Item (1), the correcting mechanism to correct the attitude of the optical element to lead a scanning light beam in a predetermined direction so as to adjust the position of the scanning light beam or a part of the correcting mechanism is arranged below the scanning light beam region or above the scanning light beam region in the proceeding direction of the light beam scanning by the scanning section.

With this arrangement, it becomes possible to utilize effectively a space taking place below the scanning light beam region or above the scanning light beam region in the proceeding direction of the light beam as a machine component attaching space. Therefore, as compared with the case that the correcting mechanism is arranged at the outside of the scanning beam region, the attaching position of the correcting mechanism can be adjusted with allowance so as to contribute greatly to make an image forming apparatus incorporating the scanning optical device in a small size.

According to the scanning optical device related to Item (2), the correcting mechanism or a part of the correcting mechanism is arranged in the scanning light beam region between the scanning section and the first mirror member or in the scanning light beam region between the second mirror member and the lens member. With this arrangement, it becomes possible to utilize effectively a space taking place below the scanning light beam region or above the scanning light beam region in the proceeding direction of the light beam between the second mirror member and the lens member. Therefore, as compared with the case that the correcting mechanism is arranged at the outside of the scanning beam region, it become possible to make the scanning optical device in the embodiment to bent the scanning light beam so that this arrangement contributes greatly to make an image forming apparatus incorporating the scanning optical device in a small size.

According to the scanning optical device related to Item (3), the detecting section of a part of the correcting mechanism is arranged between the second mirror member and the lens member. Therefore, as compared with the case that the detecting section to detect the upper limit position and the lower limit position of the lens member is arranged at the outside of the scanning beam region, it become possible to make the scanning optical device in the embodiment to bent the scanning light beam in a small size so that this arrangement contributes greatly to make an image forming apparatus incorporating the scanning optical device in a small size.

According to the scanning optical device related to Item (4), since the detecting section comprises the direction changing member to change the stretching direction of the first steel wire member connected to the shifting section and the follower piece and the second steel wire member connected to the follower piece and the urging member, the detecting section of a part of the correcting mechanism can be arranged between the second mirror member and the lens member.

Therefore, as compared with the case that the detecting section to detect the upper limit position and the lower limit position of the lens member is arranged at the outside of the scanning beam region, it become possible to make the scanning optical device in the embodiment to bent the scanning light beam in a small size.

According to the scanning optical device related to Item (5), since the base plate for attaching sensors is fixed with screws through the plurality of elongated hole sections to the base plate for attaching the shifting section, the detecting section can be attached adjustably for the base plate for attaching the shifting section. This arrangement contributes greatly to make an image forming apparatus incorporating the scanning optical device in a small size.

According to the scanning optical device related to Item (6), since a correction center mark provide at a central portion of the follower piece connected to the shifting section is aligned with the optical axis of the optical sensor attached to the base plate for attaching sensors, it becomes possible to conduct positioning simply in a short time the detecting section on the base plate for attaching sensors for the base plate for attaching the shifting section. With this, the adjusting area of the lens member which makes the central portion of the follower piece as a correction center can be securely held.

According to the image forming apparatus related to Item (6), since the image forming apparatus comprises the scanning optical device related to the present invention, as compared with the image forming apparatus in which the correcting mechanism is arranged at the outside of the scanning light beam region, the present invention contributes greatly to make the image forming apparatus incorporating the scanning optical device in a small size.

What is claimed is:

1. A scanning optical device, comprising:
   a light source to emit a light beam;
   a deflecting section to deflect the emitted light beam so as to scan;
   an optical element to make the scanning light beam to converge; and
   a correcting mechanism to correct an attitude of the optical element so as to adjust a converging position of the scanning light beam;
   wherein at least a part of the correcting mechanism is arranged between the deflecting section and the optical element,
   and
   wherein the correcting mechanism comprises a shifting section to shift the optical element so as to adjust a converging position of the scanning light beam and a detecting section to detect a shifted position of the optical element shifted by the shifting section, and at least the detecting section is arranged between the deflecting section and the optical element.

2. The scanning optical device described in claim 1, wherein the at least a part of the correcting mechanism is arranged at a side of an optical path of the scanning light beam.

3. The scanning optical device described in claim 2, further comprising:
   a base plate on which the deflecting section and the optical element are mounted,
   wherein the at least a part of the correcting mechanism is arranged between the optical path of the scanning light beam and the base plate.

4. The scanning optical device described in claim 3, further comprising:
   a first mirror member to reflect the scanning light beam deflected by the deflecting section, and
   a second mirror to reflect the scanning light beam reflected by the first mirror member so as to enter the optical element
   wherein the base plate has a first surface and a second surface opposite to the first surface, the deflecting section and the first mirror member are mounted on the first surface, the second mirror member and the optical element are mounted on the second surface, and the at least a part of the correcting mechanism is arranged between the deflecting section and the first mirror member or between the second mirror member and the optical element.

5. The scanning optical device described in claim 4, wherein the at least a part of the correcting mechanism is arranged near the optical element between the second mirror member and the optical element.

6. The scanning optical device described in claim 1, wherein the detecting section comprises a wire member whose one end is connected to the shifting section, a follower piece attached on the wire member, an urging member connected to another end of the wire member so as to pull the wire member and an optical sensor to detect a position of the follower piece shifting in synchronization with a shift of the optical element.

7. The scanning optical device described in claim 6, wherein the detecting section further comprises a plate member to which the optical sensor is attached, and the plate member is able to shift on the base plate so as to allow positioning between the follower piece and the optical sensor.

8. A scanning optical device, comprising:
   a light source to emit a light beam;
   a deflecting section to deflect the emitted light beam so as to scan;
   an optical element to make the scanning light beam to converge; and
   a correcting mechanism to correct an attitude of the optical element so as to adjust a converging position of the scanning light beam;
   wherein at least a part of the correcting mechanism is arranged between the deflecting section and the optical element,
   and
   wherein the correcting mechanism comprises a shifting section to shift the optical element so as to adjust a converging position of the scanning light beam, the shifting section comprises a plurality of gears connected the optical element and a pulling member to pull the plurality of gears so as to remove play among the plurality of gears, and the pulling member is arranged between the deflecting section and the optical element.

9. The scanning optical device described in claim 8, wherein the pulling member comprises a wire member whose one end is connected to the shifting section, a follower piece attached on the wire member, an urging member connected to another end of the wire member so as to pull the wire member and the correcting mechanism further comprises a optical sensor to detect the position of the follower piece adapted to shift in synchronization with a shift of the optical member.

10. An image forming apparatus, comprising:

a photoreceptor drum, and an scanning optical device to scan the photoreceptor drum with a scanning light beam based on image information so as to form an electrostatic latent image;

the scanning optical device, comprising:

a light source to emit a light beam;

a deflecting section to deflect the emitted light beam so as to scan on the photoreceptor drum;

an optical element to make the scanning light beam to converge on the photoreceptor drum; and a correcting mechanism to correct an attitude of the optical element so as to adjust a converging position of the scanning light beam on the photoreceptor drum;

wherein at least a part of the correcting mechanism is arranged between the deflecting section and the optical element, and wherein the correcting mechanism comprises a shifting section to shift the optical element so as to adjust a converging position of the scanning light beam and a detecting section to detect a shifted position of the optical element shifted by the shifting section, and at least the detecting section is arranged between the deflecting section and the optical element.

* * * * *